3,086,984
CYCLOMATIC NICKEL ALLYL COMPOUNDS
Michael Dubeck, Royal Oak, Mich., assignor to Ethyl Corporation, New York, N.Y., a corporation of Delaware
No Drawing. Filed Dec. 27, 1960, Ser. No. 78,214
4 Claims. (Cl. 260—439)

This invention relates to novel organometallic compounds and more specifically to cyclomatic nickel allyl compounds wherein the nickel atom is bonded to an allylic group and further is bonded to a cyclomatic group.

It is an object of this invention to provide a novel class of cyclomatic nickel allyl compounds. A further object is to provide a process for the preparation of such compounds. Other objects will become apparent from a reading of the specification and claims which follow.

The objects of this invention are accomplished by providing compounds represented by the formula

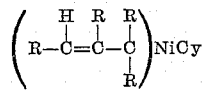

in which R is a univalent group containing from zero to 10 carbon atoms and Cy is a cyclomatic group. Preferably, R is either a univalent hydrocarbon group containing from one to about 8 carbon atoms of hydrogen. Examples of typical hydrocarbon groups encompassed by R are the lower alkyls such as methyl, ethyl, propyl, butyl, hexyl, and octyl; the lower aryls such as phenyl, tolyl, ethylphenyl and the like; the lower aralkyls such as phenylethyl, p-ethylphenylbutyl and benzyl; lower alicyclic groups such as cyclohexyl, 4-ethylcyclohexyl, cyclopentyl and the like, and lower alkenyl groups such as propenyl, butenyl, butadienyl, cyclopentadienyl, cycloheptenyl, hexenyl and the like. Further, R can be substituted with such groups as halogen, alkoxy, aryloxy, carbethoxy, carbamide, thioether, nitro, nitroso and hydroxy.

The cyclomatic hydrocarbon groups, designated by the term Cy in the above formula, is a cyclopentadienyl-type hydrocarbon group. By this, it is meant that the radical contains the cyclopentadienyl moiety. In general, such cyclomatic hydrocarbon groups can be represented by the formulae

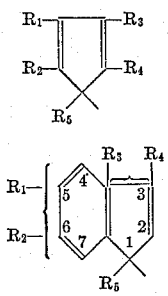

wherein the R's are selected from the group consisting of hydrogen and univalent hydrocarbon radicals.

A preferred class of cyclomatic groups suitable in the practice of my invention are those which contain from five to about 13 carbon atoms. These are exemplified by cyclopentadienyl, indenyl, methylcyclopentadienyl, propylcyclopentadienyl, diethylcyclopentadienyl, phenylcyclopentadienyl, tert-butyl cyclopentadienyl, p-ethylphenyl cyclopentadienyl, 4-tert-butyl indenyl and the like. The compounds which yield these groups are preferred as they are the more readily available cyclomatic compounds, and the compounds of my invention containing these groups have the more desirable physical characteristics which render them of superior utility.

By virtue of the electrons donated to the nickel atom from the cyclomatic group and the allyl group, the nickel atom achieves the electron configuration of krypton. Although not bound by any theory, my novel compounds are believed to have the following structure as illustrated by the compound cyclopentadienyl nickel allyl.

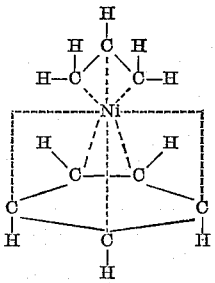

As shown above, the allyl group is depicted as donating 3 electrons to the nickel atom and the cyclopentadienyl ring is depicted as donating 5 electrons to nickel in its zero oxidation state. This gives a total of 8 donated electrons and results in the nickel atom having the electron configuration of krypton which is the next higher inert gas above nickel in the periodic table.

Typical examples of my novel compounds are cyclopentadienyl nickel 2-butenyl, octylcyclopentadienyl nickel hendecenyl, indenyl nickel phenylpropenyl, methylcyclopentadienyl nickel 2-pentenyl, cyclopentadienyl nickel hexenyl, and the like.

My compounds are made by reacting a nickel salt with a cyclomatic salt and an allyl Grignard having the formula

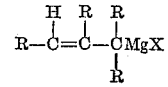

in which X is a halogen, preferably bromine. The cyclomatic group Cy, in the cyclomatic salt is as defined previously. Typical of such cyclomatic salts are a cyclomaticalkali metal salt such as cyclopentadienyl sodium. Preferably, the cyclomatic-alkali metal salt is a cyclomatic sodium salt. Other cyclomatic salts which can be employed in my process are those having the formula

CyMgX in which Cy has the meaning defined above and X is a halogen which is preferably bromine.

The nickel salts employed in our process can be nickel halides, sulfates, acetate, and the like. Preferably, however, the nickel salt is a halide such as, for example, nickel dichloride or nickel dibromide.

In conducting my process, the allyl Grignard is generally added to the nickel salt after which the cyclomatic salt is added to the reaction mixture. This mode of addition can be reversed, however, and the cyclomatic salt can be added first followed by the allyl Grignard. Also, all of the reactants can be mixed together simultaneously. In the case where all of the reactants are mixed simultaneously, it is preferable that the cyclomatic salt employed be a cyclomatic Grignard compound as defined above.

My process is conducted in the presence of a neutral solvent which is preferably an ether or a mixture of ethers. Typical of such solvents are diethyl ether, tetrahydrofuran, diethyleneglycol dimethylether and the like. The process is conducted over a temperature range from about minus 50 to about 50° C. Preferably, however, the process is conducted from about minus 10 to about 30° C., since within this temperature range yields are maximized while undesired side reactions are minimized. My process can be conducted under pressure although normally this is not necessary, and atmospheric pressure is employed. Preferably, the reaction mixture is agitated, since this makes for more intimate mixing and thereby gives an even reaction rate.

My process is conducted under a blanketing atmosphere of an inert gas such as helium, nitrogen, argon, krypton, and the like. This prevents oxidative decomopsition of my products and the reactants used in their formation.

The quantities of reactants employed in my process are not critical. Thus, I generally employ equivalent quantities of reactants or one mole of a nickel salt, one mole of an allyl Grignard compound, and one mole of a cyclomatic salt.

My products are readily separated from the reaction mixture by conventional means. The solvent is first stripped from the reaction product after which the product can be further purified by sublimation, distillation at reduced pressures, fractional recrystallization or chromatography.

To further illustrate my novel compounds and the novel method employed in their preparation, there are presented the following examples in which all parts and percentages are by weight unless otherwise indicated.

*Example I*

To a reaction vessel having a nitrogen atmosphere were added 300 ml. of dry diethyl ether and 35 grams of magnesium turnings. A crystal of iodine was introduced into the reaction vessel and the mixture was stirred until the color had disappeared. To the reaction mixture was then added slowly over a 9½ hour period, 60.5 grams of allyl bromide in 300 ml. of anhydrous diethyl ether. The reaction temperature was maintained at 20° C. The product was obtained as a clear blue solution of allyl magnesium bromide in diethyl ether.

To a reaction vessel having a nitrogen atmosphere was added 17.23 grams of anhydrous nickel iodide and 70 ml. of anhydrous ether. After cooling to —10° C., there was then added 0.05 gram-mole of allyl magnesium bromide in ether solution over a one-hour period. After the addition of the allyl magnesium bromide, the reaction mixture was stirred for ¾ of an hour. There was then added at minus 50° C., 0.05 gram-mole of cyclopentadienyl sodium in tetrahydrofuran solution. The cyclopentadienyl sodium was added over a 1½ hour period. After addition of the cyclopentadienyl sodium, the reaction mixture was stirred for an additional ¾ of an hour. It was then warmed to 20° C. and the reaction product was discharged. The solvent was removed by means of reduced pressure and the residue was sublimed repeatedly onto a cold finger. After several sublimations, there was obtained the compound cyclopentadienyl nickel allyl which is red-purple in color, melts at 7–9° C., sublimes easily, and is soluble in ether, tetrahydrofuran and carbon tetrachloride. On analysis of the compound, it was found that it contained 35.8 percent nickel which corresponds quite closely with the theoretical nickel content which is 35.6 percent.

*Example II*

To one mole of nickel bromide maintained under a nitrogen atmosphere is added one mole of 2-butenyl magnesium bromide in tetrahydrofuran solution. There is then added one mole of octylcyclopentadienyl sodium in tetrahydrofuran solution. The reaction mixture is stirred under a nitrogen atmosphere for four hours at 0° C. after which the reaction product is discharged and filtered. The filtrate is evaporated at reduced pressure and room temperature and the resulting residue is dissolved in petroleum ether and chromatographed on alumina to give a good yield of octylcyclopentadienyl nickel 2-butenyl.

*Example III*

One mole of nickel iodide is charged to a reaction vessel under an atmosphere of nitrogen. There is then added one mole of 2-hendecenyl magnesium bromide in diethyl ether solution. Following this, there is then added one mole of cyclopentadienyl sodium in tetrahydrofuran solution. The reaction mixture is then heated for five hours at 20° C. under a nitrogen atmosphere with stirring. The reaction product is then discharged, filtered, and the filtrate is evaporated at reduced pressure and room temperature. The residue is dissolved in petroleum ether and chromatographed on alumina to give a good yield of cyclopentadienyl nickel 2-hendecenyl.

*Example IV*

To one mole of nickel acetate is added one mole of phenylpropen-2-yl magnesium bromide in diethyl ether. There is then added one mole of methylcyclopentadienyl magnesium bromide in ether solution. Both additions are carried out under a blanketing atmosphere of nitrogen. After adding the reactants at minus 50° C., the reaction mixture is agitated under nitrogen and allowed to warm to 25° C. over a six-hour period. The reaction vessel is then discharged and a good yield of methylcyclopentadienyl nickel phenylpropen-2-yl is obtained from the reaction mixture by means of chromatography as employed in the previous examples.

*Example V*

To one mole of nickel iodide maintained under a nitrogen atmosphere is added one mole of cyclopentadienyl sodium in tetrahydrofuran solution. There is then added one mole of 2-hexenyl magnesium bromide in diethyl ether solution. The reaction mixture is then heated at 25° C. for two hours under nitrogen atmosphere with stirring. The reaction product is then discharged, filtered, and the filtrate is evaporated at reduced pressure and room temperature. The residue is dissolved in petroleum ether and chromatographed on alumina to give a good yield of cyclopentadienyl nickel 2-hexenyl.

*Example VI*

To a reaction vessel having a nitrogen atmosphere is charged one mole of nickel bromide. There is then added one mole of 2-pentenyl magnesium bromide in diethyl ether solution. Following this, there is added one mole of methylcyclopentadienyl potassium in tetrahydrofuran solution. The reaction mixture is then heated at 50° for one hour with agitation under a nitrogen atmosphere. The reaction vessel is then discharged and a good yield of methylcyclopentadienyl nickel 2-pentenyl is obtained from the reaction product by means of chromatography as in the previous examples.

My compounds are very useful chemical intermediates since the allylic group attached to the nickel atom is in a reactive form making possible its use as a synthesis intermediate in preparing organic compounds. Further, my compounds are effective antiknock agents when added to gasoline which is employed in the operation of spark ignition internal combustion engines. When so employed, my compounds may be utilized as the primary antiknock or as a supplemental antiknock in addition to a tetraalkyllead compound such as tetraethyllead, tetramethyllead and the like. When used as a supplemental antiknock in addition to a lead alkyl, there may also be present scavengers such as halohydrocarbon or phosphorus compounds. Typical halohydrocarbon scavengers are ethylene dichloride and ethylene dibromide. Typical phosphorus-containing scavengers are trimethylphosphate, tricresylphosphate, phenyldimethylphosphate, tris($\beta$-chloropropyl) thionophosphate and the like.

The compounds of my invention have further utility as additives to residual and distillate fuels generally, e.g., jet fuels, home heater fuels and diesel fuels, to reduce smoke and/or soot. Further, they are lubricity improvers when used as additives in lubricating oils.

My compounds may be incorporated in paints, varnish, printing inks, synthetic resins of the drying oil type, oil enamels and the like to impart improved drying characteristics to such compositions. Also, my compounds may be employed as additives to solid fuels to control burning rate. Another important utility of my compounds is their use as chemical intermediates in the preparation of metal-containing polymeric materials.

A still further important use for my compounds is in gas phase plating. When so employed, my compounds are decomposed by heating them in a vessel which contains the object to be plated. On decomposition, a nickel-containing coating is laid down on the object. The coating may be used for decorative purposes, to protect the surface of the object from corrosion, or to form an electrically conductive surface on the object. The plating is carried out in the presence of an inert atmosphere so as to prevent oxidation of the coating or the object which is being coated.

Having fully defined the novel compounds of my invention, their mode of preparation and their many utilities, I desire to be limited only within the lawful scope of the appended claims.

I claim:
1. Organometallic compounds having the formula

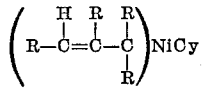

in which R is selected from the group consisting of hydrogen and univalent hydrocarbon groups containing from one to about 8 carbon atoms selected from the class consisting of alkyl, aryl, aralkyl, alicyclic and alkenyl groups, Cy is a cyclomatic hydrocarbon group containing from 5 to about 13 carbon atoms, and the nickel atom has the electronic configuration of krypton.

2. Cyclopentadienyl nickel allyl.

3. Process comprising reacting a nickel salt with an allyl Grignard compound having the formula

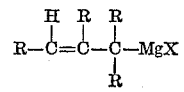

in which X is a halogen and R is selected from the group consisting of hydrogen and univalent hydrocarbon groups containing from one to about 8 carbon atoms selected from the class consisting of alkyl, aryl, aralkyl, alicyclic and alkenyl groups, and with a cyclomatic salt selected from the class consisting of alkali metal cyclomatic salts and cyclomatic Grignard reagents.

4. Process for the preparation of cyclopentadienyl nickel allyl, said process comprising reacting nickel iodide with allyl magnesium bromide and with cyclopentadienyl sodium.

References Cited in the file of this patent
UNITED STATES PATENTS 2,818,416     Brown et al.  ----------- Dec. 31, 1957